(12) United States Patent
Kramer et al.

(10) Patent No.: US 9,156,407 B1
(45) Date of Patent: Oct. 13, 2015

(54) VEHICULAR STORAGE ASSEMBLY AND METHODS OF USE AND MANUFACTURE THEREOF

(71) Applicant: Honda Motor Co., Ltd., Tokyo (JP)

(72) Inventors: Kevin Kramer, Hilliard, OH (US); Neal W. Luginbill, Marysville, OH (US); Nathaniel Joseph Buchheit, Marysville, OH (US); Michael Wiedeman, Rancho Palos Verdes, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/489,180

(22) Filed: Sep. 17, 2014

(51) Int. Cl.
*B60R 7/04* (2006.01)
(52) U.S. Cl.
CPC ........................................ *B60R 7/04* (2013.01)
(58) Field of Classification Search
CPC .................................. B60R 7/04; B60R 7/06
USPC ....................................................... 296/24.34
See application file for complete search history.

(56) References Cited

U.S. PATENT DOCUMENTS

| | | | |
|---|---|---|---|
| 4,685,729 A * | 8/1987 | Heesch et al. | 297/188.09 |
| 6,726,267 B2 | 4/2004 | Kim et al. | |
| 6,851,736 B1 | 2/2005 | Klopp, III et al. | |
| 7,278,681 B2 | 10/2007 | Lilov et al. | |
| 7,416,235 B2 * | 8/2008 | Rajappa et al. | 296/37.8 |
| 7,431,365 B2 | 10/2008 | Sturt et al. | |
| 7,434,859 B2 | 10/2008 | Mulvihill | |
| 7,475,954 B1 * | 1/2009 | Latunski | 312/297 |
| 7,481,475 B1 | 1/2009 | Lim et al. | |
| 7,530,615 B2 | 5/2009 | Ogura | |
| 7,533,918 B2 | 5/2009 | Spykerman et al. | |
| 7,770,952 B2 | 8/2010 | Hanzel | |
| 7,770,954 B2 | 8/2010 | D'Alessandro | |
| 7,802,833 B2 | 9/2010 | Boreanaz et al. | |
| 8,162,520 B2 | 4/2012 | Penner | |
| 8,256,814 B2 | 9/2012 | Thorsell et al. | |
| 8,474,897 B1 | 7/2013 | Jackson | |
| 8,616,605 B2 | 12/2013 | Hipshier et al. | |
| 8,714,617 B2 | 5/2014 | Hipshier et al. | |
| 2007/0085363 A1 | 4/2007 | Sturt et al. | |
| 2009/0058120 A1 | 3/2009 | Ioka et al. | |
| 2010/0072767 A1 * | 3/2010 | D'Alessandro | 296/24.34 |
| 2010/0078954 A1 | 4/2010 | Liu et al. | |
| 2011/0037287 A1 * | 2/2011 | Penner | 296/37.8 |
| 2011/0068598 A1 | 3/2011 | Penner | |
| 2012/0119534 A1 | 5/2012 | Shimozaki | |

\* cited by examiner

*Primary Examiner* — Jason S Morrow
(74) *Attorney, Agent, or Firm* — Kenealy Vaidya LLP

(57) ABSTRACT

Some embodiments are directed to a storage assembly for use with a vehicle that includes a front instrument panel. The storage assembly can include a housing defining an interior space and a front exterior surface; and an external storage portion disposed adjacent the front exterior surface of the housing. The external storage portion can define an open storage area extending between the front exterior surface of the housing and the front instrument panel. The storage assembly can also include a moveable storage receptacle that defines a movable storage area. The moveable storage receptacle can be configured to move between a closed position in which at least a portion of the moveable storage receptacle is disposed within the interior space of the housing, and an open position in which at least a portion of the moveable storage receptacle is disposed proximate the open storage area.

20 Claims, 7 Drawing Sheets

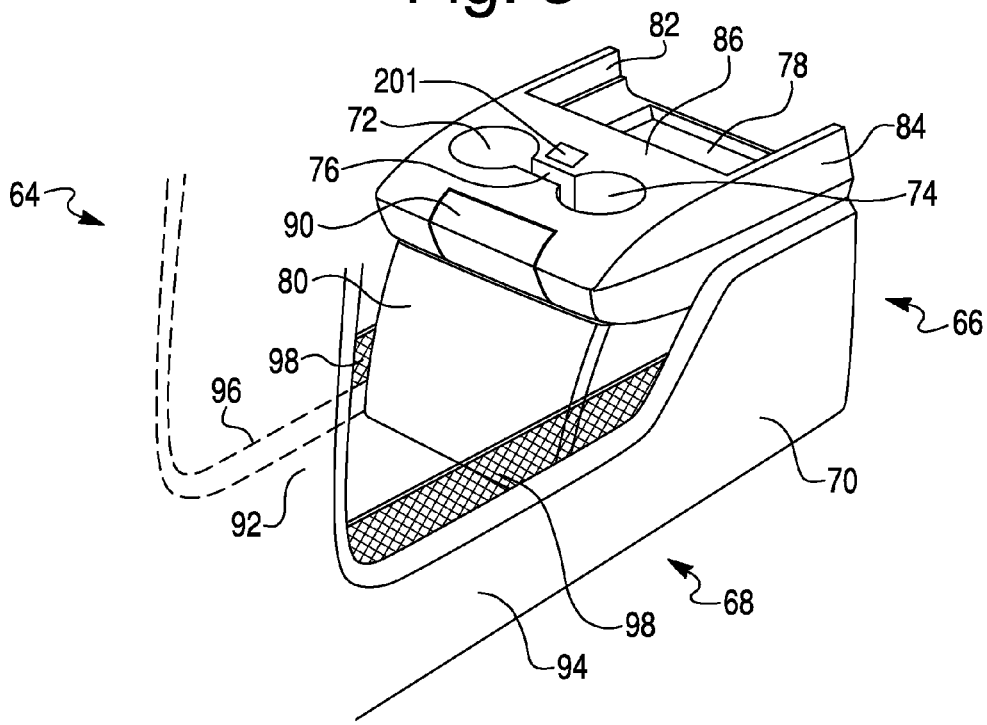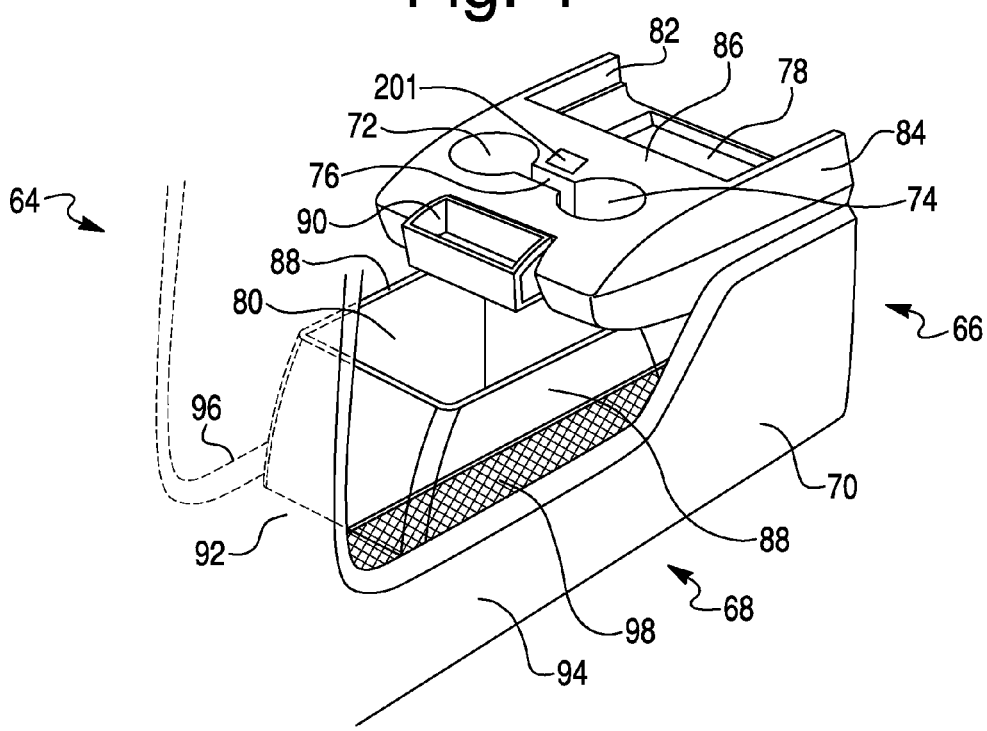

VEHICULAR STORAGE ASSEMBLY AND METHODS OF USE AND MANUFACTURE THEREOF

BACKGROUND

The disclosed subject matter relates to a vehicular storage assembly, and methods of use and manufacture thereof. More particularly, the disclosed subject matter relates to methods and apparatus for storing various articles within an interior passenger compartment of a vehicle, such as via apparatus that are at least partially integrated with other vehicular interior components.

Spaces can be provided in an interior compartment of a vehicle for the purpose of storing or otherwise housing various articles, such as money (including change), writing instruments, documents, cleaning supplies, glasses, gum, etc. The related art includes storage areas that are integrated with various structures in the vehicular passenger compartment, such as the seats. Some of these storage spaces are provided in the form of a center console disposed between the driver's seat and the front passenger's seat, while other such storage compartments are provided between rear passenger seats. Some of these storage spaces include compartments that provide the ability to shield or otherwise enclose stored articles, while also allowing vehicular passengers (including the driver) to access the stored articles. Shielding or otherwise enclosing articles may be beneficial for various reasons, such as to control the location of the stored articles, which would otherwise be subject to movement within the interior of the vehicle based on the vehicle's motion.

SUMMARY

It may be beneficial to provide a large volume of enclosed storage space to enable the enclosed storage of a large volume of articles. However, the enclosed storage space occupies available space within the vehicle's interior passenger compartment, and thus may intrude on space that could otherwise be used for other purposes, such as space used to occupy the driver and passenger(s), space used to provide other functionalities, etc. In other words, a tradeoff exists between the amount of enclosed storage space and the amount of space that could be used for other purposes.

It may also be beneficial to provide separate storage compartments to enable the grouping of different stored articles, such as to facilitate organization. However, providing separate storage compartments may require additional space, and thus encroach on the amount of space used for other purposes, thereby exacerbating the above tradeoff between the amount of storage space and the amount of space used for other purposes.

It may therefore be beneficial to provide a vehicular storage assembly, and methods of use and manufacture thereof, that address at least one of the above issues. For example, it may be beneficial to provide an enhanced amount of enclosed storage space while reducing encroachment on the amount of interior space used for other purposes. It may also be beneficial to provide separate storage compartments while also reducing this encroachment.

Some embodiments are therefore directed to a storage assembly for use with a vehicle that includes a front instrument panel. The storage assembly can include a housing defining an interior space and a front exterior surface; and an external storage portion disposed adjacent the front exterior surface of the housing. The external storage portion can define an open storage area extending between the front exterior surface of the housing and the front instrument panel. The storage assembly can also include a moveable storage receptacle that defines a movable storage area. The moveable storage receptacle can be configured to move between a closed position in which at least a portion of the moveable storage receptacle is disposed within the interior space of the housing, and an open position in which at least a portion of the moveable storage receptacle is disposed proximate the open storage area.

Some other embodiments are directed to a vehicular storage assembly that can include an external open storage area defined in part by a front instrument panel, a pair of side walls, and a bottom surface. The vehicular storage assembly can also include a housing assembly defining an interior space and a front exterior surface that defines a rear surface of the external open storage area. The housing assembly can include a moveable storage receptacle that defines a movable storage area. The moveable storage receptacle can be configured to move between a closed position in which at least a portion of the moveable storage receptacle is disposed within the interior space of the housing, and an open position in which at least a portion of the moveable storage receptacle is disposed proximate the external open storage area.

Still other embodiments are directed to a method of manufacturing a storage assembly for use with a vehicle. The method can include: defining an interior space with a housing; disposing an external storage portion adjacent a front exterior surface of the housing so as to define an open storage area between the front exterior surface of the housing and a front instrument panel of a vehicle; defining a movable storage area with a moveable storage receptacle; and configuring the moveable storage receptacle to move between a closed position in which at least a portion of the moveable storage receptacle is disposed within the interior space of the housing, and an open position in which at least a portion of the moveable storage receptacle is disposed proximate the open storage area.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 3 is a front perspective view of an alternative exemplary embodiment of a vehicle storage assembly in accordance with the disclosed subject matter with a moveable storage receptacle disposed in a retracted position.

FIG. 4 is a front perspective view of the alternative vehicle storage assembly of FIG. 3 with the moveable storage receptacle disposed in an extended position.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. STORAGE ASSEMBLY APPLICATIONS

Figure 1:
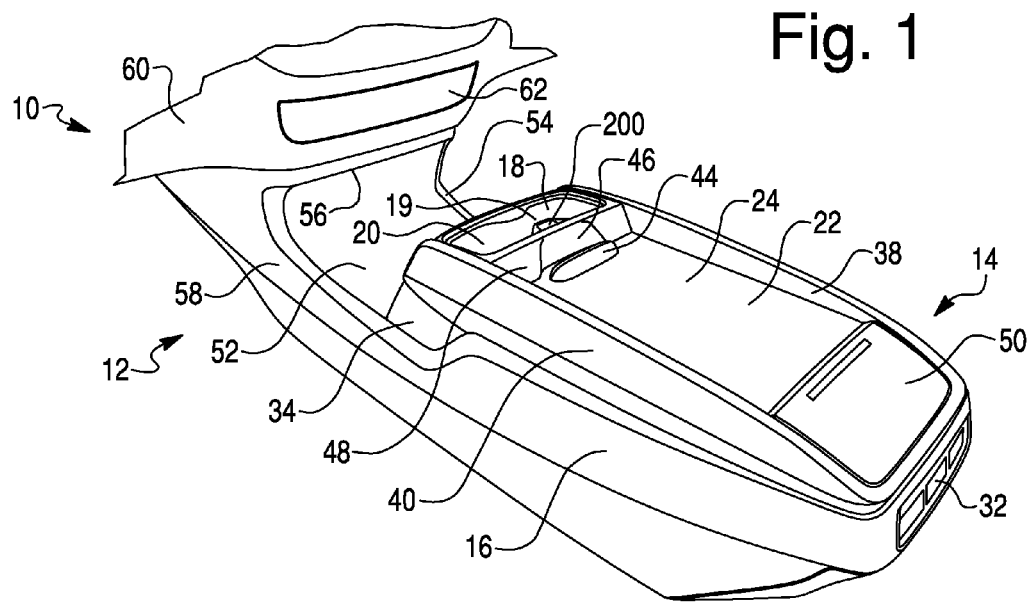
FIG. 1 is a rear perspective view of a vehicle storage assembly in accordance with the disclosed subject matter.
Figure 2:
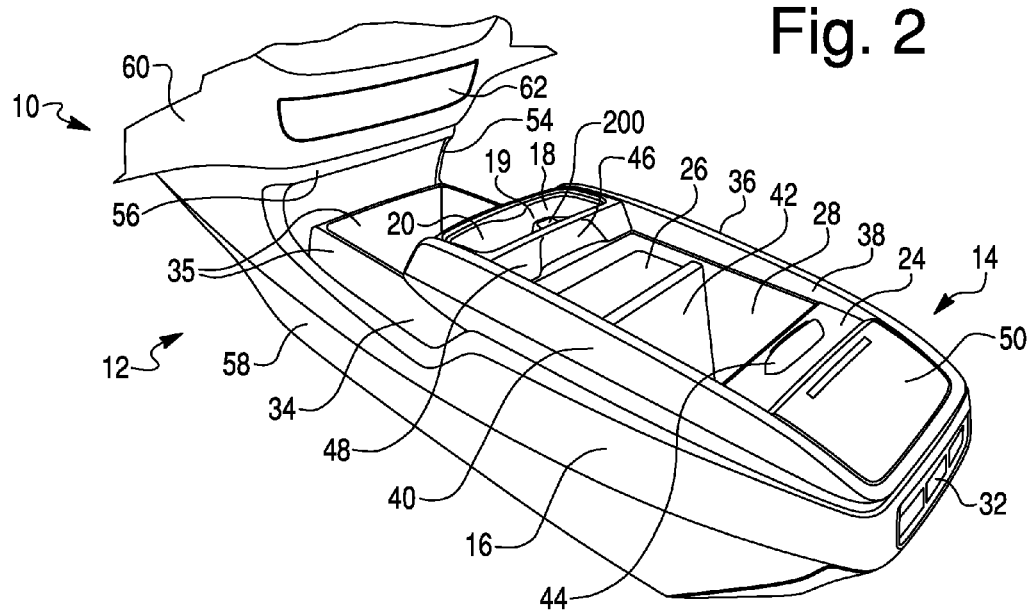
FIG. 2 is a rear perspective view of the vehicle storage assembly of FIG. 1 with a front moveable storage receptacle and top storage area portion disposed in open positions.

FIGS. 1 and 2 are rear perspective views of an exemplary embodiment of a vehicle storage assembly 10, also referred to herein and in the related art as a vehicle "console". For clarity of the drawings, the related vehicle is substantially omitted, and a vehicle instrument panel 60 is only partially illustrated.

The exemplary storage assembly 10 can be configured for use in any vehicle, such as but not limited to a passenger car, minivan, truck, all-terrain vehicle (ATV), semi-tractor, off-highway vehicle, etc. In some of the illustrated embodiments, the storage assembly is configured for use in a minivan that includes at least one seat, but may also include a pair of seats positioned in the front portion in the vehicle with space between the seats adequate to receive the exemplary storage assembly 10. However, embodiments are intended to include or otherwise cover configurations for use in any type of vehicle, such as an aircraft, boat, ship, train, spacecraft, etc. In fact, embodiments are intended to include or otherwise cover non-vehicular configurations, such as in the contexts stadium, theater, or event seating.

The vehicle storage assembly 10 can be removably connected to any internal vehicular surface or component, such as a vehicular seat assembly, a vehicular floor, etc. It is understood that the term "connect" is not limited to a direct mechanical, electrical, and/or communication connection between components, but may also include an indirect mechanical, electrical, and/or communication connection between multiple components. Alternatively, the vehicle storage assembly 10 can be integrally or unitarily formed with these components.

In some of the disclosed embodiments, vehicle storage assembly 10 is positioned between the driver's seat and the front passenger seat, and oriented in a longitudinal direction relative to a longitudinal axis of the vehicle. However, the various embodiments are intended to include or otherwise cover any position and orientation that may be beneficial, such as between the rear passenger seats.

II. FIRST EXEMPLARY EMBODIMENT

In the exemplary embodiment shown FIGS. 1 and 2, vehicle storage assembly 10 includes a housing 14 and an external storage portion 12. The housing 14 can include a trim panel 16, first and second cupholders 18, 20, a recessed storage area 22, a moveable cover 24, a recessed storage area 26, a hidden storage receptacle 28, a rear storage compartment 50, a power port 32, and a moveable storage receptacle 34. However, embodiments are intended to include or otherwise cover any housing configurations that may be beneficial, such as housing configurations that include additional or alternative features to the features disclosed above. For example, some embodiments include housing configurations that do not include any of the above features, and instead include other features that are consistent with the disclosed inventive concepts. A few alternative housing configurations are shown in FIGS. 3-6.

The housing 14 can be configured in an oblong or rectangular shape, and may include an interior space that is partially or substantially hollow. Other embodiments are intended to include or otherwise cover any shape, dimension, or structure of housing 14 that could be configured as a vehicular console. Trim panels 16 and 36 can form a seamless exterior surface of housing 14, and may be configured to provide an aesthetically pleasing appearance. In an alternative embodiment, multiple trim panels are secured together to form exterior trim panels 16 and 36.

The first and second cupholders 18, 20 can include any configuration for receiving and retaining a container, such as a beverage container, including but not limited to a cup, bottle, can, insulated beverage container, etc. In some embodiments, the first and second cupholders 18, 20 define circular cylindrical indentations for receiving and retaining the beverage containers. Each of the first and second cupholders 18, 20 can include an adjustment mechanism to permit secure reception and retention of any one of differently sized and/or shaped beverage containers.

In the exemplary embodiment of FIGS. 1 and 2, the first and second cupholders 18, 20 may partially or fully join together and may be partially separated by a slot 19. The slot 19 can be beneficial for various reasons. For example, the surfaces defining the slot 19 provide for a limited amount of contact with the exterior surface of the beverage container disposed therein to enhance retention. However, the open space provided by the slot 19 can be used to house objects or portions of objects, such as handles of mugs disposed in the cupholders 18, 20. An elongated item can be received into slot 19 (such as when beverage containers are not disposed in the cupholder(s)) that would not otherwise fit within either cupholder 18, 20. As other examples, slot 19 can accommodate personal items that include, but are not limited to, a mobile telephone, a digital music player, a writing utensil, a set of keys, a wallet or small purse, a food container, coins and/or any item that could be advantageously placed within reach of a user and remain secured.

The recessed storage area 22 can be configured as a substantially rectangular indentation. Exemplary embodiments are intended to include and otherwise cover a recessed storage area 22 formed in any shape that is appropriate for storage. The moveable cover 24 can form a bottom support surface of the recessed storage area 22. Second and third walls 38, 40 can bound the recessed storage area 22 on two opposing sides. The second and third walls 38, 40 can abut a first wall 48, which can bound the recessed storage area on a third side. Recessed storage area 22 thereby defines an open storage area that can accommodate one or more personal items, such as but not limited to a purse, computer bag or other type of bag, food sack or container, electronic device, etc.

Moveable cover 24 can serve dual functions as both a bottom support surface of recessed storage area 22 as well as a retractable cover to hidden storage areas within housing 14. Moveable cover 24 can be movable between a fully closed position (FIG. 1), a fully open position (FIG. 2), or any position between the fully open and closed positions, i.e., a partially open position. To open movable cover 24, a user can engage handle 44 to retract moveable cover 24 into housing 14. A concave indent 46 can be formed in first wall 48 to provide adequate space behind handle 44 to enhance manual operation of the handle 44, e.g., so that a user's hand does not impact the first wall 48 when opening or closing movable cover 24, or so that the first wall 48 is not an impediment to grasping the handle 44. After accessing hidden storage spaces, a user can move movable cover 24 into a secure, closed position as illustrated in FIG. 1.

When disposed in a partially open position, moveable cover 24 can expose an exemplary recessed storage area 26. In this disposition, a portion of moveable cover 24 may continue to function as recessed storage area 22. Recessed storage area 26 can be disposed within housing 14 and can be configured as a substantially rectangular recess. Exemplary embodiments are intended to include or otherwise cover recessed storage area 26 formed with any appropriate shape and dimension. The recessed storage area 26 can be formed on opposing sides by second and third walls 38 and 40 and dividing member 42. In this configuration, dividing member 42 can separate recessed storage area 26 from other structures and devices in housing 14. The recessed storage area 26 can be further configured with a bottom surface that can accommodate one or more user items that can include, but are not limited to, a mobile telephone, a digital music player, a writing utensil, a set of keys, a wallet, a food container, etc.

When placed in a fully open position, cover 24 can also provide access to the hidden storage receptacle 28. Hidden storage receptacle 28 can be formed within an interior of housing 14 and configured as a substantially rectangular open space. In an alternative embodiment, hidden storage receptacle 28 can be configured with any appropriate shape and dimension. The hidden storage receptacle 28 can be bound on multiple sides by second and third walls 38, 40 and dividing member 42. Hidden storage receptacle 28 can be configured to accommodate any one or more items that include, but are not limited to, a mobile telephone, a digital music player, a writing utensil, a set of keys, a wallet or purse, a food container, a tissue dispenser, etc.

Recessed storage area 26 and hidden storage receptacle 28 are beneficial for various reasons. For example, when the movable cover 24 is in the fully open position, they may provide open storage areas, which increases the size of objects that are capable of being housed therein. Alternatively, when the movable cover 24 is in the fully closed position, both the recessed storage area 26 and hidden storage receptacle 28 provide closed storage areas, which enables objects to be more securely retained therein.

In addition, dividing member 42 divides these two storage spaces to facilitate organization or grouping of items retained therein. In order to enhance this organization, grouping, and/or to provide alternative functionalities, a false floor can be provided in one or both of the recessed storage area 26 and hidden storage receptacle 28. The false floor can provide additional divided spaces to enhance organization and grouping of items stored therein. In addition, the false floor can provide for more secure storage of items stored beneath the false floor, such as to hide these items, e.g., in the context of preventing or impeding unauthorized access and/or removal.

The moveable storage receptacle 34 can be configured as a substantially rectangular storage bin. Movable storage receptacle 34 can be formed with perpendicular walls 35 of a predetermined height supported by a bottom surface. Exemplary embodiments are intended to include and otherwise cover a moveable storage receptacle having any appropriate shape and dimension.

Moveable storage receptacle 34 can be received into an area of housing 14 without interfering with other housing amenities or features. Moveable storage receptacle 34 can be placed in a fully closed position (FIG. 1), a fully open position (FIG. 2), or in any position between the fully open and closed positions (i.e., a partially open position). In the closed position, a first wall of the movable storage receptacle 34 can be disposed as a partial enclosure to housing 14. In an open position, the moveable storage receptacle 34 extends away from housing 14. Moveable storage receptacle 34 can be configured to accommodate one or more user items that include, but are not limited to, a mobile telephone, a digital music player, a writing utensil, a set of keys, a wallet or purse, a food container, a tissue dispenser, etc.

Embodiments are intended to include or otherwise cover any methods and apparatus for actuating or moving the moveable storage receptacle 34 between its open and closed positions. For example, in the embodiments shown in FIGS. 1 and 2, a button 200 is provided to actuate or otherwise cause the movable storage receptacle 34 to move from its closed position to its open position.

The movable storage receptacle 34 can be retained in its closed position by any latching or locking mechanism. If the movable storage receptacle 34 is in the closed position, the button 200 can be manually actuated, such as by applying a downward force thereto, to override the latching or locking mechanism to allow the movable storage receptacle 34 to open. The movable storage receptacle 34 can thereby be manually opened, or alternatively a mechanism, such as a spring, can be provided to automatically open the movable storage receptacle 34 upon the latching or locking mechanism being overridden.

The power port 32 can be configured as one or more industry-standard power outlets that can provide electric power to various hand-held electronic devices. Exemplary embodiments are intended to include and otherwise cover a power port 32 configured to have any shape and complying with any product, industry, or national standard as appropriate for an electrical or recharging port. Power port 32 can be further configured to power or recharge one or more user devices that can include, but are not limited to, a mobile telephone, a digital music player, a GPS device, a portable computing tablet, laptop computer, etc. For example, power port 32 can provide a variety of power connection types and voltages that can be found in commercial use for portable electronic devices such as a USB ("Universal Serial Bus"), mobile telephone charger connections, 12V DC "cigarette" outlets, and 120V AC or 240V AC power outlets. Power port 32 can be positioned in a back portion of housing 14.

In an alternative embodiment, one or more power ports 32 can be positioned at any location on vehicle storage assembly 10 that can be convenient to provide power to a user's electronic device. In an additional alternative embodiment, power port 32 can be configured as an audio jack connection to a vehicle's radio receiver. In an alternative embodiment, one or more power ports 32 can be configured to include an LED (Light Emitting Diode) or incandescent light that can provide a convenient lighting source inside a vehicle.

The rear storage compartment 50 can be configured as a rear storage area with a removable retractable cover. Exemplary embodiments are intended to include and otherwise cover a rear storage compartment 50 that can be formed in any shape as appropriate for storage. The rear storage compartment 50 can accommodate personal items that include, but are not limited to, a mobile telephone, a digital music player, a writing utensil, a set of keys, a wallet or small purse, a food container, coins or any item that could be advantageously placed within reach of a user and remain secured.

The external storage portion 12 can include an open storage area 52, a first side wall 54, a second side wall 58, and a third side wall 56. The third side wall 56 can be formed by, or be integral or unitary with, an instrument panel 60 of the vehicle. The open storage area 52 can be configured as a substantially rectangular storage area. Exemplary embodiments are intended to include and otherwise cover an open storage area 52 formed in any shape as appropriate for open storage. The first side wall 54 and the second side wall 58 can be formed as extension members of housing 14. First and second side walls 54, 58 can bound the open storage area 52 on two opposing sides. The first and second side walls 54, 58 can abut third side wall 56, which can bound the open storage area 52 on a third side. These components 54, 56, 58 can cooperate to define the open storage area 52.

Side walls 54, 56, 58 can extend away from housing 14 and connect to the vehicle instrument panel 60 or other structural elements of a vehicle. However, as discussed above, at least the third side wall 56 can be formed by, or be integral or unitary with, and instrument panel 60 of the vehicle. To provide additional convenience amenities or functionalities for a user, instrument panel 60 can include a retractable storage tray or cupholder (tray) 62. Exemplary embodiments are intended to include or otherwise cover a tray 62 formed with any appropriate shape and dimension. Tray 62 extends over the movable storage receptacle 34 when both the tray 62 and movable storage receptacle 34 are in their open positions. Thus, the tray 26 extends over at least a part of the external storage portion 12 and thereby above or within open storage area 52.

In an alternative embodiment, side walls 54, 56, 58 can be omitted from external storage portion 12. In this configuration, instrument panel 60 can cooperate with a bottom surface of open storage area 52 to define the open storage area 52.

Open storage area 52 can be configured to accommodate any one of a plurality of user items, including but not limited to a purse, a computer bag or other type of bag, a food sack or container, or an electronic device. Open storage area 52 can also receive moveable storage receptacle 34 when the moveable storage receptacle 34 in placed in an open or partially open position.

In other words, the movable storage receptacle 34 occupies all or part of the space provided by open storage area 52 when the movable storage receptacle 34 is disposed in its open position. However, when the movable storage receptacle 34 is disposed in its closed position, the open storage area 52 is available for storage of other items. For example, if the moveable storage receptacle 34 is in an open position and a situation arises where it would be beneficial for the open storage area 52 to store items, then moveable storage receptacle 34 can be conveniently moved to a closed position and secured into housing 14, thereby providing the open storage area 52 with the ability to store the items.

The above relative dispositions of the open storage area 52 and movable storage receptacle 34 are advantageous for various reasons. For example, this disposition enhances the efficiency of space within the interior of the vehicle. For example, the open storage area 52 is available for open storage when the movable storage receptacle 34 is in its closed position, while the open area provided by the open storage area 52 is available to provide space sufficient to enable the movable storage receptacle 34 to be moved to its open position.

This efficiency of space is further enhanced by the disposition and orientation of the retractable storage tray 62. For example, the retractable storage tray 62 opens from an opposing direction relative to the movable storage receptacle 34, and in its open position extends above the movable storage receptacle 34 (when opened) within an upper section of the open storage area 52 or above the open storage area 52.

Embodiments are intended to include or otherwise cover any configurations, shapes, sizes, etc., of the above features, that still enable the open storage area 52 to be available for open storage when the movable storage receptacle 34 is in its closed position, while also enabling the open area provided by the open storage area 52 to be available to provide space sufficient for the movable storage receptacle 34 to be moved to its open position.

III. ALTERNATIVE EMBODIMENT OF FIGS. 3 AND 4

FIGS. 3 and 4 illustrate front perspective views of an exemplary second embodiment for a vehicle storage assembly 64 in accordance with the disclosed subject matter. For further clarity and brevity of the drawings, a partial front view of the alternative vehicle storage assembly 64 is illustrated.

As shown FIGS. 3 and 4, vehicle storage assembly 64 can include a housing 66 and an external storage portion 68. The housing 66 can include a trim panel 70, first and second cupholders 72, 74, a recessed storage area 78, and a moveable storage receptacle 80.

The housing 66 can be configured in an oblong or rectangular shape, and may include an interior space that is partially or substantially hollow. Other embodiments are intended to include or otherwise cover any shape, dimension, or structure of housing 66 that can be configured as a console for a vehicle. The trim panel 70 can form a seamless exterior surface of housing 66, and can be provided with an aesthetically pleasing appearance. In an alternative embodiment, multiple trim panels are secured together to form exterior trim panel 70.

The first and second cupholders 72, 74 can be configured in any appropriate manner that can securely receive and retain a beverage container, such as but not limited to a plastic cup, bottle, can, insulated beverage container, etc. The first and second cupholders 72, 74 can define circular cylindrical indentations. Each of the first and second cupholders 72, 74 can include an adjustment mechanism that can permit the first and second cupholders 72, 74 to securely receive any one of differently sized and/or shaped beverage containers.

In the exemplary embodiment of FIGS. 3 and 4, the first and second cupholders 72, 74 may partially or fully join together to create a slot 76 therebetween. The slot 76 can be beneficial for various reasons. For example, the surfaces defining the slot 76 provide for a limited amount of contact with the exterior surface of the beverage container disposed therein to enhance retention. However, the open space provided by the slot 76 can be used to house objects or portions of objects, such as handles of mugs disposed in the cupholders 72, 74. Alternatively, an elongated item can be received into slot 76 (such as when beverage containers are not disposed in the cupholder(s)) that would otherwise not fit within either cupholder alone. As other examples, slot 76 can accommodate personal items that include, but are not limited to, a mobile telephone, a digital music player, a writing utensil, a set of keys, a wallet or small purse, a food container, coins or any item that could be advantageously placed within reach of a user.

The recessed storage area 78 can be configured as a substantially rectangular storage opening. Exemplary embodiments are intended to include and otherwise cover a recessed storage area 78 formed in any shape as appropriate for storage. First and second side walls 82, 84 can bound the recessed storage area 78 on two opposing sides. The first and second side walls 82, 84 can abut third side wall 86, which can bound the recessed storage area on a third side. For brevity and clarity, a fourth side wall is not shown in FIGS. 3 and 4, but may be provided to form a rear panel. Recessed storage area 78 can accommodate one or more personal items, such as but not limited to a mobile telephone, a digital music player, a writing utensil, a set of keys, a wallet, a food container, etc.

A coin tray 90 can be disposed at a front end of housing 66 to provide a closable container for storing small items, such as coins. The coin tray 90 can be placed in a retracted position as shown in FIG. 3 to thereby provide closed storage. Alternatively, the coin tray 90 can be placed in an open position as shown in FIG. 4 to thereby provide open storage or otherwise provide access to the storage area and/or items stored therein. Embodiments are intended to include or otherwise cover any methods and apparatus for moving coin tray 90 between its open and closed positions, and for retaining the coin tray 90 in those positions. Embodiments are also intended to cover any type of such movement, such as moving between open and closed positions via rotation, linear movement, swiveling, etc.

The moveable storage receptacle 80 can be configured as a substantially rectangular storage bin. The moveable storage receptacle 80 can be provided to have any appropriate shape and dimension. Movable storage receptacle 80 can be formed with perpendicular walls 88 of a predetermined height supported by a bottom surface.

Moveable storage receptacle 80 can be received into an area of housing 66 without interfering with other housing amenities or features. Moveable storage receptacle 80 can be placed in a fully closed position (FIG. 3), a fully open position (FIG. 4), or in any position between the fully closed and open positions, i.e., a partially open position. In the closed position, a first wall of the moveable storage receptacle 80 can be disposed as a partial enclosure to housing 66, i.e., the first wall can form at least a part of the front will of the housing 66. In the open position, the moveable storage receptacle 80 extends away from housing 66.

Embodiments are intended to include or otherwise cover any methods and apparatus for actuating or moving the movable storage receptacle 80 between its open and closed positions. For example, in the embodiments shown in FIGS. 3 and 4, a button 201 is provided to actuate or otherwise cause the movable storage receptacle 80 to move from its closed position to its open position.

The movable storage receptacle 80 can be retained in its closed position by any latching or locking mechanism. If the movable storage receptacle 80 is in the closed position, the button 201 can be manually actuated, such as by applying a downward force thereto, to override the latching or locking mechanism to allow the movable storage receptacle 80 to open. The movable storage receptacle 80 can thereby be manually opened, or alternatively a mechanism, such as a spring, can be provided to automatically open the movable storage receptacle 80 upon the latching or locking mechanism being overridden.

Moveable storage receptacle 80 can be configured to accommodate one or more user items that include, but are not limited to, a mobile telephone, a digital music player, a writing utensil, a set of keys, a wallet or purse, a food container, a tissue dispenser, etc.

The external storage portion 68 can include an open storage area 92, a first side wall 94, and a second side wall 96. The open storage area 92 can be configured as a substantially rectangular storage area. Exemplary embodiments are intended to include and otherwise cover an open storage area 92 formed in any shape as appropriate for storage.

The first side wall 94 and the second side wall 96 can be formed as extension members of housing 66. First and second side walls 94, 96, can extend away from housing 66 and connect to a vehicle instrument panel or other structural elements of a vehicle. First and second side walls 94, 96 can bound the open storage area 92 on two opposing sides. First and second side walls 94, 96 can abut a third side wall (not shown) which can bound the open storage area 92 on a third side. The third side wall can at least partially be formed by vehicle instrument panel. These components 94, 96, and the third side wall can cooperate to define the open storage area 92. Open storage area 92 can be configured to accommodate one or more user items including, but not limited to a purse, a computer bag, a case, a food sack or container, or an electronic device.

In an alternative embodiment, first and second side walls 94, 96 can be omitted from external storage portion 68. In this configuration, instrument panel 60 can cooperate with a bottom surface of open storage area 92 and the front panel of the movable storage receptacle 80 to define the open storage area 92.

External storage portion 68 can further include a net guard 98. Net guard 98 can be installed along an upper edge of each first and second side walls 94, 96 in order to prevent personal items from accidentally escaping open storage area 92. In other words, the net guard 98 operates to increase the height of the first and second side walls 94, 96 to increase the volume of protected space provided by the open storage area 92.

Open storage area 92 can also be configured to receive moveable storage receptacle 80 when the receptacle 80 in placed in an open or partially open position. In other words, the movable storage receptacle 80 occupies all or part of the space provided by open storage area 92 when the movable storage receptacle 80 is disposed in its open position. However, when the movable storage receptacle 80 is disposed in its closed position, the open storage area 92 is available for storage of other items. For example, if the moveable storage receptacle 80 is in an open position and a situation arises where it would be beneficial for the open storage area 92 to store items, then moveable storage receptacle 80 can be conveniently moved to a closed position and secured into housing 66, thereby providing the open storage area 92 with the ability to store the items.

The above relative dispositions of the open storage area 92 and movable storage receptacle 80 are advantageous for various reasons. For example, this disposition enhances the efficiency of space within the interior of the vehicle. For example, the open storage area 92 is available for open storage when the movable storage receptacle 80 is in its closed position, while the open area provided by the open storage area 92 is available to provide space sufficient to enable the movable storage receptacle 80 to be moved to its open position.

Embodiments are intended to include or otherwise cover any configurations, shapes, sizes, etc., of the above features, that still enable the open storage area 92 to be available for open storage when the movable storage receptacle 80 is in its closed position, while also enabling the open area provided by the open storage area 92 to be available to provide space sufficient for the movable storage receptacle 80 to be moved to its open position.

IV. ALTERNATIVE EMBODIMENT OF FIGS. 5 AND 6

Figure 5:
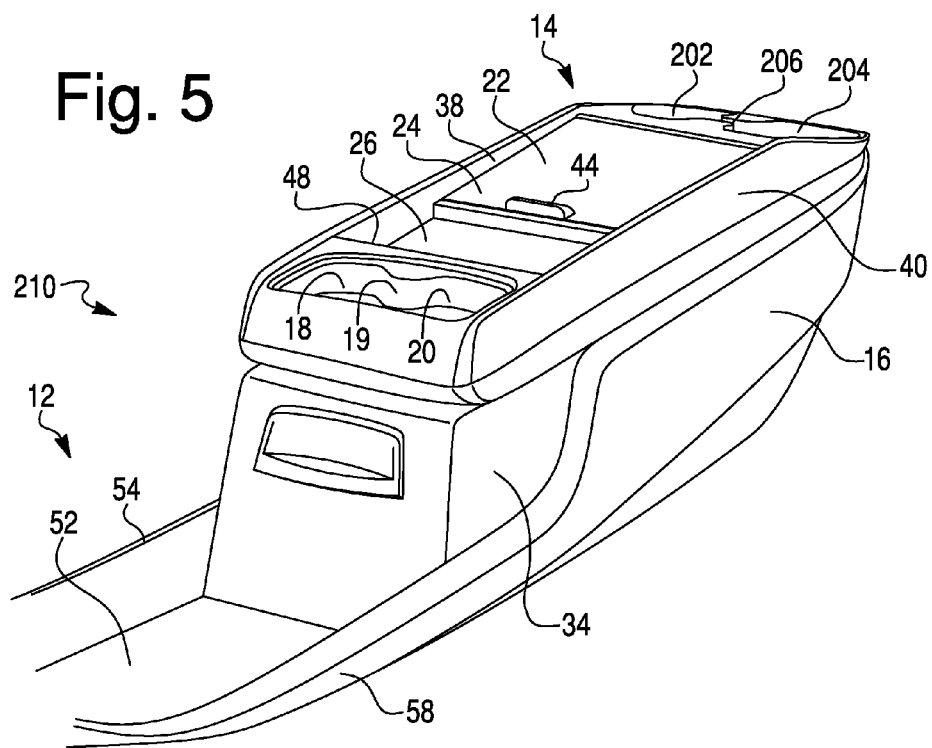
FIG. 5 is a front perspective view of another alternative exemplary embodiment of a vehicle storage assembly in accordance with the disclosed subject matter with a movable storage receptacle disposed in a retracted position.
Figure 6:
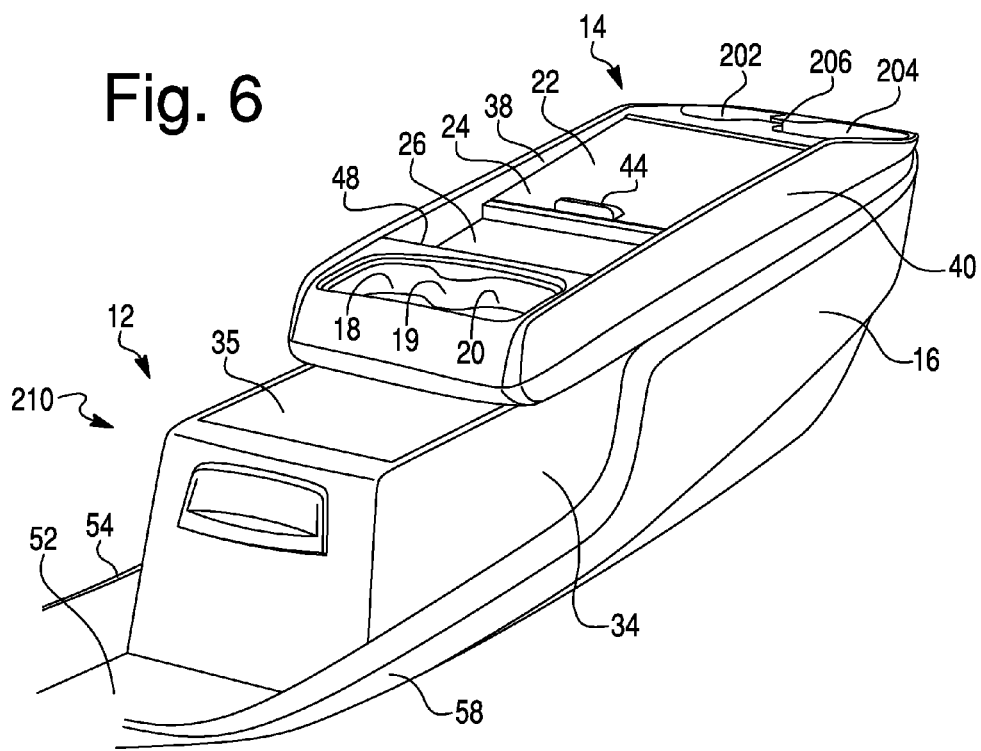
FIG. 6 is a front perspective view of the alternative vehicle storage assembly of FIG. 5 with the movable storage receptacle disposed in an extended position.

FIGS. 5 and 6 illustrate front perspective views of an exemplary third embodiment of a vehicle storage assembly 210 in accordance with the disclosed subject matter.

In the exemplary embodiment shown FIGS. 5 and 6, vehicle storage assembly 210 includes a housing 14 and an external storage portion 12. The housing 14 can include a trim panel 16, first and second cupholders 18, 20, a recessed storage area 22, a moveable cover 24, a recessed storage area 26, a hidden storage receptacle under recessed storage area 22, rear cupholders 202, 204, and a moveable storage receptacle 34. However, embodiments are intended to include or otherwise cover any housing configurations that may be beneficial, such as housing configurations that include additional or alternative features to the features disclosed above. For example, some embodiments include housing configurations that do not include any of the above features, and instead include other features that are consistent with the disclosed inventive concepts.

The housing 14 can be configured in an oblong or rectangular shape, and may include an interior space that is partially or substantially hollow. Other embodiments are intended to include or otherwise cover any shape, dimension, or structure of housing 14 that could be configured as a vehicular console. Trim panels 16 (and opposing panel not shown) can form a seamless exterior surface of housing 14, and may be configured to provide an aesthetically pleasing appearance. In an alternative embodiment, multiple trim panels are secured together to form exterior trim panels 16.

The first and second cupholders 18, 20 can include any configuration for receiving and retaining a container, such as a beverage container, including but not limited to a cup, bottle, can, insulated beverage container, etc. In some embodiments, the first and second cupholders 18, 20 define circular cylindrical indentations for receiving and retaining the beverage containers. Each of the first and second cupholders 18, 20 can include an adjustment mechanism to permit secure reception and retention of any one of differently sized and/or shaped beverage containers.

In the exemplary embodiment of FIGS. 5 and 6, the first and second cupholders 18, 20 may partially or fully join together and may be partially separated by a slot 19. The slot 19 can be beneficial for various reasons. For example, the surfaces defining the slot 19 provide for a limited amount of contact with the exterior surface of the beverage container disposed therein to enhance retention. However, the open space provided by the slot 19 can be used to house objects or portions of objects, such as handles of mugs disposed in the cupholders 18, 20. An elongated item can be received into slot 19 (such as when beverage containers are not disposed in the cupholder(s)) that would not otherwise fit within either cupholder 18, 20. As other examples, slot 19 can accommodate personal items that include, but are not limited to, a mobile telephone, a digital music player, a writing utensil, a set of keys, a wallet or small purse, a food container, coins and/or any item that could be advantageously placed within reach of a user and remain secured.

An additional set of cupholders 202, 204 can be provided at a rear end of the housing 14, with a slot 206 defined therebetween. The cupholders 202, 204 and slot 206 can be configured similarly to cupholders 18, 20 and slot 19 disclosed above.

The recessed storage area 22 can be configured as a substantially rectangular indentation. Exemplary embodiments are intended to include and otherwise cover a recessed storage area 22 formed in any shape that is appropriate for storage. The moveable cover 24 can form a bottom support surface of the recessed storage area 22. Second and third walls 38, 40 can bound the recessed storage area 22 on two opposing sides. Recessed storage area 22 thereby defines an open storage area that can accommodate one or more personal items, such as but not limited to a purse, computer bag or other type of bag, food sack or container, electronic device, etc.

An exemplary recessed storage area 26 can be disposed within housing 14 adjacent to movable cover 24, and can be configured as a substantially rectangular recess. Exemplary embodiments are intended to include or otherwise cover recessed storage area 26 formed with any appropriate shape and dimension. The recessed storage area 26 can be formed on opposing sides by second and third walls 38 and 40 and form an open storage space. The recessed storage area 26 can be further configured with a bottom surface that can accommodate one or more user items that can include, but are not limited to, a mobile telephone, a digital music player, a writing utensil, a set of keys, a wallet, a food container, etc.

Moveable cover 24 can serve dual functions as both a bottom support surface of recessed storage area 22 as well as a retractable cover to a hidden storage area within housing 14 (corresponding to hidden storage receptacle 28 of FIG. 2). Moveable cover 24 can be movable between a fully closed position, a fully open position, or any position between the fully open and closed positions, i.e., a partially open position. To open movable cover 24, a user can engage handle 44 to retract moveable cover 24 into housing 14. After accessing hidden storage space, a user can move movable cover 24 into a secure, closed position as illustrated in FIG. 1.

When placed in a fully open position, cover 24 can also provide access to the hidden storage receptacle. The hidden storage receptacle can be formed within an interior of housing 14 and configured as a substantially rectangular open space. In an alternative embodiment, hidden storage receptacle can be configured with any appropriate shape and dimension. The hidden storage receptacle can be bound on multiple sides by second and third walls 38, 40. The hidden storage receptacle can be configured to accommodate any one or more items that include, but are not limited to, a mobile telephone, a digital music player, a writing utensil, a set of keys, a wallet or purse, a food container, a tissue dispenser, etc.

A false floor can be provided in one or both of the recessed storage area 26 and the hidden storage receptacle. The false floor can provide additional divided spaces to enhance organization and grouping of items stored therein. In addition, the false floor can provide for more secure storage of items stored beneath the false floor, such as to hide these items, e.g., in the context of preventing or impeding unauthorized access and/or removal.

The moveable storage receptacle 34 can be configured as a substantially rectangular storage bin. Movable storage receptacle 34 can be formed with perpendicular walls 35 of a predetermined height supported by a bottom surface. Exemplary embodiments are intended to include and otherwise cover a moveable storage receptacle having any appropriate shape and dimension.

Moveable storage receptacle 34 can be received into an area of housing 14 without interfering with other housing amenities or features. Moveable storage receptacle 34 can be placed in a fully closed position (FIG. 5), a fully open position (FIG. 6), or in any position between the fully open and closed positions (i.e., a partially open position). In the fully closed position, a first wall of the moveable storage receptacle 34 can be disposed as a partial enclosure to housing 14. In an open position, the moveable storage receptacle 34 extends away from housing 14. Moveable storage receptacle 34 can be configured to accommodate one or more user items that include, but are not limited to, a mobile telephone, a digital music player, a writing utensil, a set of keys, a wallet or purse, a food container, a tissue dispenser, etc.

Embodiments are intended to include or otherwise cover any methods and apparatus for actuating or moving the movable storage receptacle 34 between its open and closed positions. For example, in the embodiment shown in FIGS. 5 and 6, a handle is provided to manually actuate or otherwise cause the movable storage receptacle 34 to move from its closed position to its open position.

The external storage portion 12 can include an open storage area 52, a first side wall 54 and a second side wall 58. The open storage area 52 can be configured as a substantially rectangular storage area. Exemplary embodiments are intended to include and otherwise cover an open storage area 52 formed in any shape as appropriate for open storage. The first side wall 54 and the second side wall 58 can be formed as extension members of housing 14. First and second side walls 54, 58 can bound the open storage area 52 on two opposing sides.

Side walls 54, 56, can extend away from housing 14 and connect to a vehicle instrument panel or other structural elements of a vehicle. In an alternative embodiment, side walls 54, 56, can be omitted from external storage portion 12. In this configuration, the instrument panel can cooperate with a bottom surface of open storage area 52 to define the open storage area 52.

Open storage area 52 can be configured to accommodate any one of a plurality of user items, including but not limited to a purse, a computer bag or other type of bag, a food sack or container, or an electronic device. Open storage area 52 can also receive moveable storage receptacle 34 when the moveable storage receptacle 34 in placed in an open or partially open position.

In other words, the movable storage receptacle 34 occupies all or part of the space provided by open storage area 52 when the movable storage receptacle 34 is disposed in its open position. However, when the movable storage receptacle 34 is disposed in its closed position, the open storage area 52 is available for storage of other items. For example, if the moveable storage receptacle 34 is in an open position and a situation arises where it would be beneficial for the open storage area 52 to store items, then moveable storage receptacle 34 can be conveniently moved to a closed position and secured into housing 14, thereby providing the open storage area 52 with the ability to store the items.

The above relative dispositions of the open storage area 52 and movable storage receptacle 34 are advantageous for various reasons. For example, this disposition enhances the efficiency of space within the interior of the vehicle. For example, the open storage area 52 is available for open storage when the movable storage receptacle 34 is in its closed position, while the open area provided by the open storage area 52 is available to provide space sufficient to enable the movable storage receptacle 34 to be moved to its open position.

Embodiments are intended to include or otherwise cover any configurations, shapes, sizes, etc., of the above features, that still enable the open storage area 52 to be available for open storage when the movable storage receptacle 34 is in its closed position, while also enabling the open area provided by the open storage area 52 to be available to provide space sufficient for the movable storage receptacle 34 to be moved to its open position.

V. STORAGE RECEPTACLE ASSEMBLY

Figure 7:
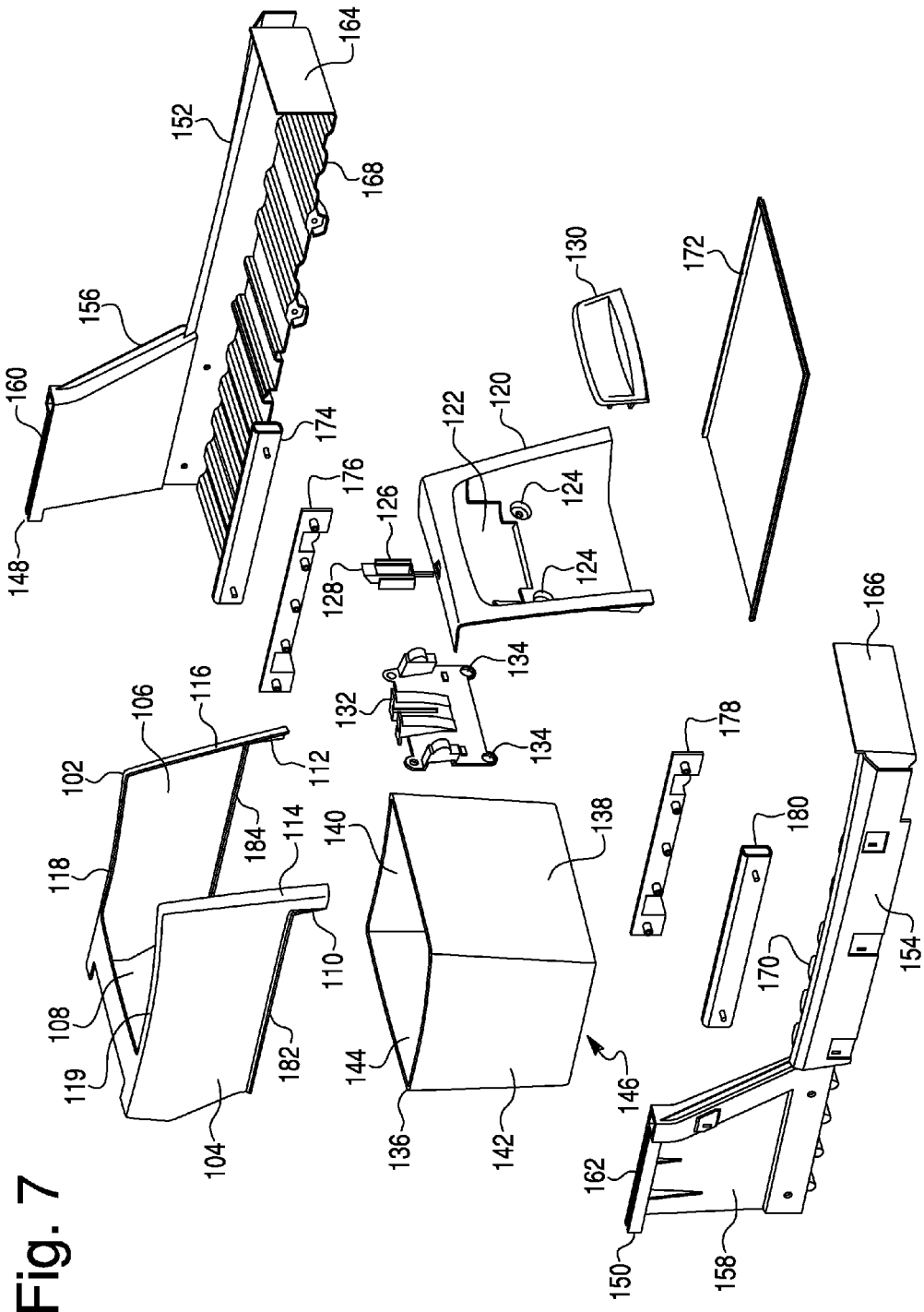
FIG. 7 is an exploded perspective view of a portion of a vehicle storage assembly including a front moveable storage assembly in accordance with the disclosed subject matter.
Figure 8:
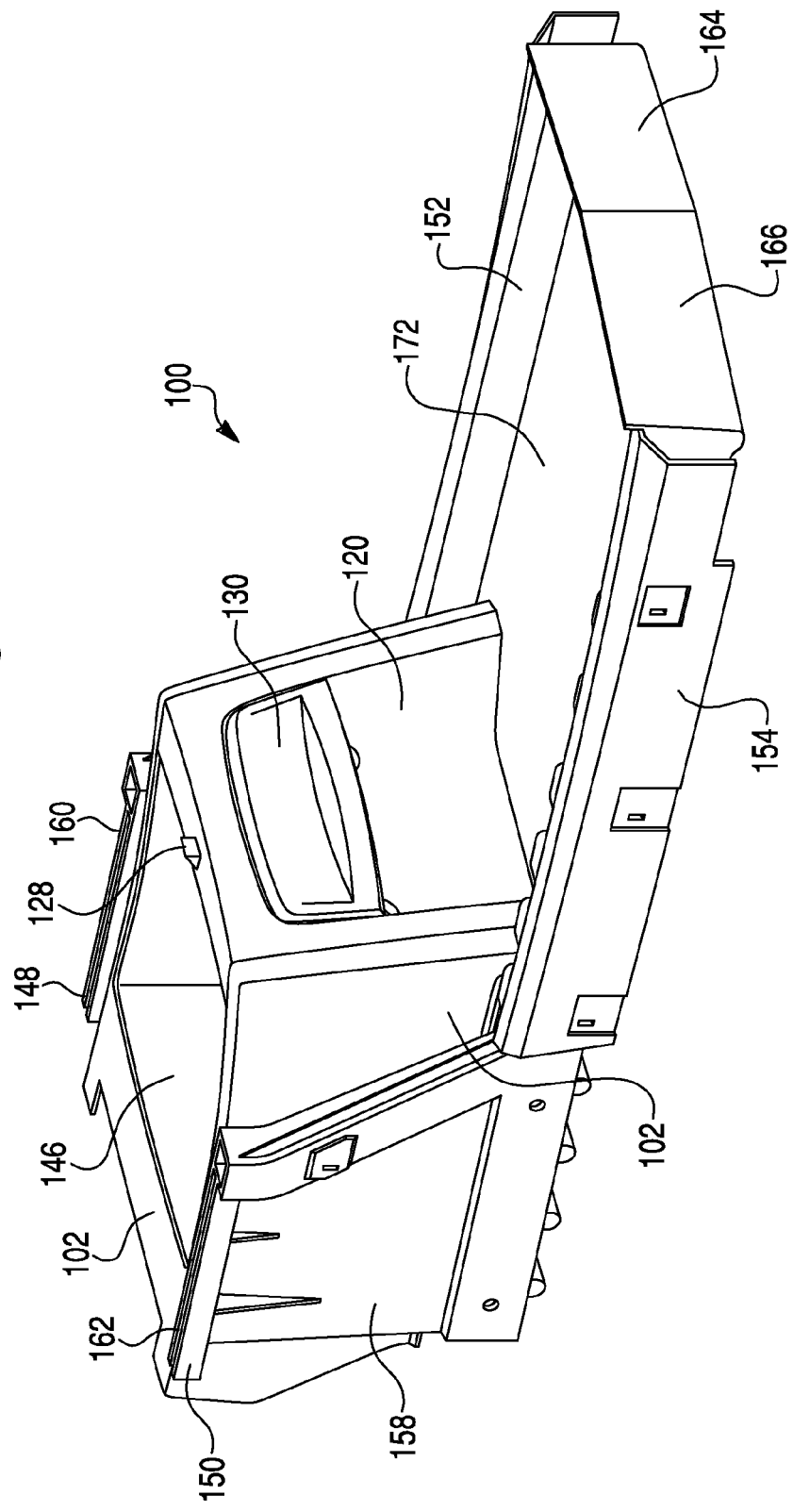
FIG. 8 is a front perspective view of the portion of the vehicle storage assembly (including the front moveable storage assembly) of FIG. 7 in an assembled condition.

FIG. 7 is an exploded perspective view of a portion of a vehicle storage receptacle assembly 100 including a front moveable storage assembly in accordance with the disclosed subject matter; and FIG. 8 is a front perspective view of the portion of the vehicle storage receptacle assembly 100 (including the front moveable storage assembly) of FIG. 7 in an assembled condition.

Various features of the storage receptacle assembly 100 of FIGS. 7 and 8 are applicable to all of the exemplary embodiments disclosed above, i.e., the first embodiment (FIGS. 1 and 2), the second embodiment (FIGS. 3 and 4), and the third embodiment (FIGS. 5 and 6). Some features shown in FIGS. 7 and 8 specifically relate to, or are consistent with, only certain of embodiments one, two and three. For example, the storage receptacle assembly 100 of FIGS. 7 and 8 includes a handle 130 that is similar to the handle shown in embodiment three (FIGS. 5 and 6), and dissimilar to the button 200, 201 of embodiments one and two. (FIGS. 1-4). However, it is intended that any of the features disclosed in FIGS. 7 and 8 can be applied to any of the embodiments shown in FIGS. 1-6, and vice-versa.

The storage receptacle assembly 100 can include a storage receptacle housing 102, a storage receptacle housing front cover 120, a handle 130, a handle base mechanism 132, a latch 128, a moveable storage receptacle 136, a first receptacle assembly base portion 148, a second receptacle assembly base portion 150, first and second movement element housings 174, 180, first and second movement elements 176, 178, and a base plate cover 172. These components 102, 120, 128, 130, 132, 136, 148, 150, 172, 174, 176, 178, 180, can cooperate to define the integrated storage receptacle assembly 100 of FIG. 8.

The storage receptacle housing 102 can be configured in any appropriate manner to receive and house a storage receptacle including, but not limited to, a moveable receptacle, an adjustable storage apparatus, etc. Storage receptacle housing 102 can include a first side wall 104, a second side wall 106, and a third, back side wall 108. Storage receptacle housing 102 can be configured to receive a storage apparatus, such as the moveable storage receptacle 136, through an open front end, and enclose the moveable storage receptacle 136 within side walls 104, 106, 108.

The first side wall 104 can be defined by a top edge 119, a bottom edge 182, and a front edge 114. A second side wall 106 can be defined by a top edge 118, a bottom edge 184, and a front edge 116. First and second side walls 104, 106 can be formed to be substantially similar in shape and dimensions, and be oriented substantially parallel to each other. The back side wall 108 can be formed to be substantially rectangular in shape, and can connect to each of the first and second side walls 104, 106 in a substantially perpendicular orientation. Storage receptacle housing can be 102 formed with walls having any appropriate shape or dimension, such as rectangular, square, circular, etc.

The front edges of first and second side walls 104, 106 of storage receptacle housing 102 can include first and second extension portions 110, 112 that can extend to a predetermined length below first and second side wall bottom edges 182, 184. In addition, a bottom edge 182 of first side wall 104 and a bottom edge 184 of second sidewall 106 can be configured to flange at a predefined angle and distance away from each respective bottom edge 182, 184.

The handle 130 can be formed as a single device with an indented front side portion. This configuration can provide a grip for a user to grasp when pulling the handle 130, such as for the purpose of moving the movable storage receptacle 136. Exemplary embodiments are intended to include and otherwise cover a handle 130 that can be formed in any shape and dimension as appropriate.

The storage receptacle housing front cover 120 can be formed in a substantially rectangular shape, and can have dimensions that are substantially similar to back wall 108 in order to seat housing front cover 120 onto first side wall front edge 114 and second side wall front edge 116. In this configuration, housing front cover 120 can cooperate with side walls 104, 106, 108 to function as a front wall for storage receptacle housing 102 as well as movable storage receptacle 136. However, exemplary embodiments are intended to include and otherwise cover a receptacle housing front cover 120 that can be formed in any shape and dimension as appropriate to cooperate as a wall closure for storage receptacle housing 102 and for the movable storage receptacle 136. Housing front cover 120 can further include an opening 122 that can be formed to have substantially similar dimensions as handle 130 to facilitate connection of the handle 130 to the housing front cover 120.

The handle base mechanism 132 can be configured as a locking mechanism that can be mounted to housing front cover 120. Handle base mechanism 132 can mount onto housing front cover 120 in any appropriate manner. The latch 128 can integrate with handle base mechanism 132 via latch extension housing 126 that can protrude through a top end of housing front cover 120.

The latch 128 and latch extension housing 126 communicate with the handle base mechanism 132 to facilitate operation of the handle 130 secured to the housing front cover 120. For example, handle 130, housing front cover 120, and handle base mechanism 132 can cooperate to form an integrated locking housing cover. Handle base mechanism 132 can connect to housing front cover 120 via connection points 134 and 124, or with any appropriate connection mechanism. Handle 130 can be mounted to handle base mechanism 132 through housing cover opening 122 in any manner appropriate. Embodiments are intended to include or otherwise cover any appropriate locking mechanism for a storage receptacle housing, such as but not limited to a key lock, slide lock, hook and loop material, etc.

The moveable storage receptacle 136 can be formed to be substantially rectangular in shape and configured to operate as a storage bin. The moveable storage receptacle 136 can be formed in any appropriate shape and dimension. Moveable storage receptacle 136 and can include a first side wall 138 and a second side wall 144 that can be connected at respective edges to third and fourth side walls 140, 142 in any appropriate manner. A bottom surface 146 can connect to side walls 138, 140, 142, and 144 in any appropriate manner. Although the moveable storage receptacle 136 is illustrated as a single unit, it can alternatively be configured as separate components.

Handle 130, housing front cover 120, and handle base mechanism 132 can be mounted to first side wall 138 of moveable storage receptacle 136 in any appropriate manner. Latch extension housing 126 and latch 128 can be biased in a locked position using a spring or other appropriate biasing element. Latch extension housing 126 and latch 128 can secure moveable storage receptacle 136 to housing 14 (FIG. 8) in any appropriate manner, such as but not limited to a strike plate installed in housing 66 above latch 128.

The first base portion 148 and second base portion 150 are intended to be two portions of a single integrated or unitary base that can connect along first and second base plates 168, 170 in any appropriate manner. First base portion 148 and second base portion 150 can be configured to have any appropriate shape and dimension that can accommodate linear movement of moveable storage receptacle 136. In an exemplary embodiment, first base portion 148 and second base portion 150 are formed in any shape and dimensions appropriate to provide rigid support to storage receptacle housing 102 and moveable storage receptacle 136, while also enabling linear movement of the moveable storage receptacle 136.

First base portion 148 can be formed as a rigid elongated member that can include multiple elements. First base portion 148 can include a first side frame member 152 that can include a first wedge member 156 that can rise to a height 160. First wedge member 156 can connect to first side frame member 152 in any appropriate manner. First base plate 168 can be formed as a rigid surface that can be flat, uneven, graded or formed in any appropriate surface pattern. First base plate 168 can connect to first side frame member 152 in any appropriate manner. First base portion front wall 164 can connect to first side frame member 152 in any appropriate manner that includes but is not limited to a perpendicular orientation.

Second base portion 150 can include a second elongated side frame member 154. Second wedge member 158 can connect to second side frame member 154 in any appropriate manner. Second wedge member 158 can be defined as having a sloped front edge that can rise to a height 162 that can be approximately the same height as first side wall top edge 119 of storage receptacle housing 102. Second base plate 170 can be formed as a flat, uneven, or graded rigid surface. Second base portion front wall 166 can connect to second side frame member 154 in any appropriate manner that includes, but is not limited to, a perpendicular orientation.

In an exemplary embodiment, base plate cover 172 can be formed in a substantially similar shape and dimensions as the combination of base plates 168, 170. Base plate cover 172 can be removably attached to combined base plates 168, 170 in any appropriate manner. Base plate cover 172 can be formed with any appropriate material, such as but not limited to rubber, plastic, woven fibers, etc.

Additional elements are provided to enable the moveable storage receptacle 136 to move linearly. For example, a first movement element 176 is provided as an elongated mechanical element that can be slidably retained within the first movement element housing 174. First movement element 176 and first movement element housing 174 can cooperate to enhance the ability of the moveable storage receptacle 136 to move from a first position to a second position. In an exemplary embodiment, first movement element 176 can be a rail bracket mounted to moveable storage receptacle 136 that can engage low friction elements, such as ball bearings, within first movement element housing 174. Element housing 174 can be mounted to first side frame member 152.

A second movement element 178 can be retained within second movement element housing 180 to further enhance the movement of moveable storage receptacle 136. Second movement element 178 and second movement element housing 180 can be substantially similar in construction and functionality as first movement element 176 and first movement element housing 174.

The exemplary integrated movement elements 174, 176, 178, 180 can thereby cooperate with moveable storage receptacle 136 to enhance movement of moveable storage receptacle 136 in forward and reverse directions relative to the storage receptacle housing 102. However, exemplary embodiments are intended to cover any additional or alternative mechanism or plurality of mechanisms that can enable the moveable storage receptacle 136 to move relative to the storage receptacle housing 102 and/or to enhance such movement. For example, additional or alternative mechanisms to facilitate such movement include, but are not limited to, a drawer rail bracket, wheels or rollers, electrically powered sliding or rolling mechanisms, pneumatically powered sliding or powered mechanisms, etc.

VI. MOVABLE STORAGE ASSEMBLY OF FIGS. 9 AND 10

Figure 9:
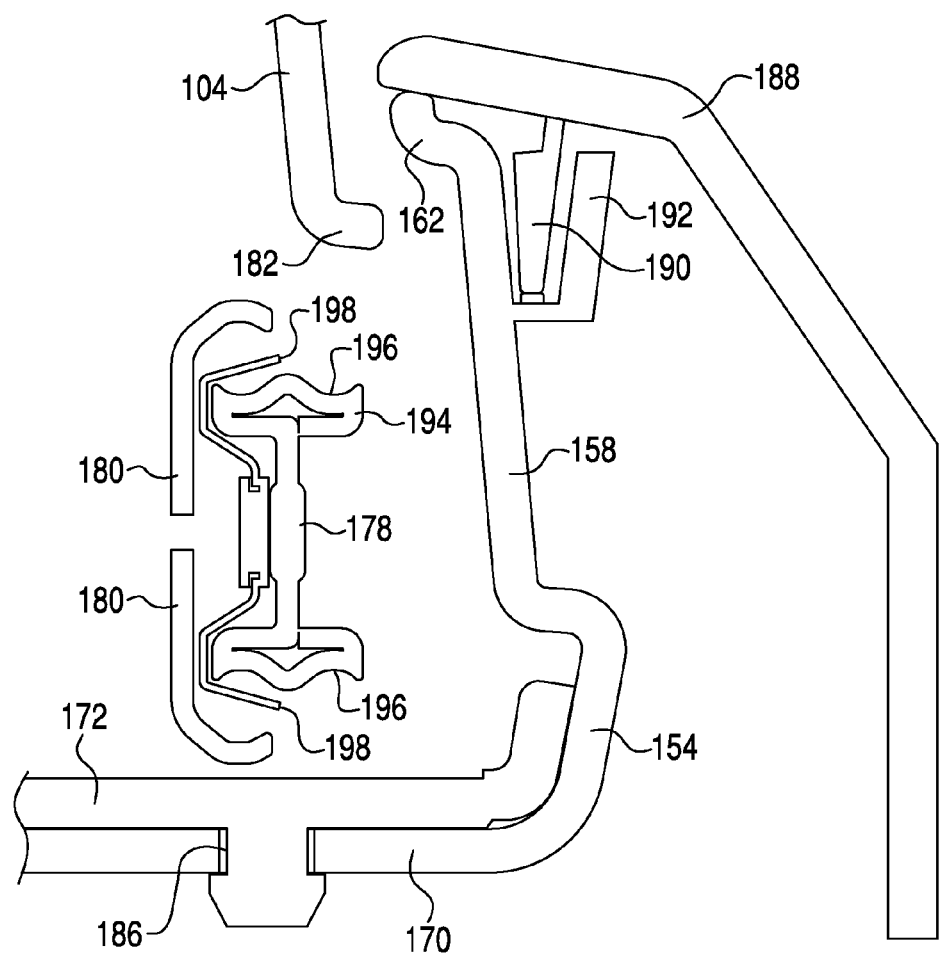
FIG. 9 is a partial cross-sectional view of portions of the vehicle storage assembly including the moveable storage assembly in accordance with the disclosed subject matter.
Figure 10:
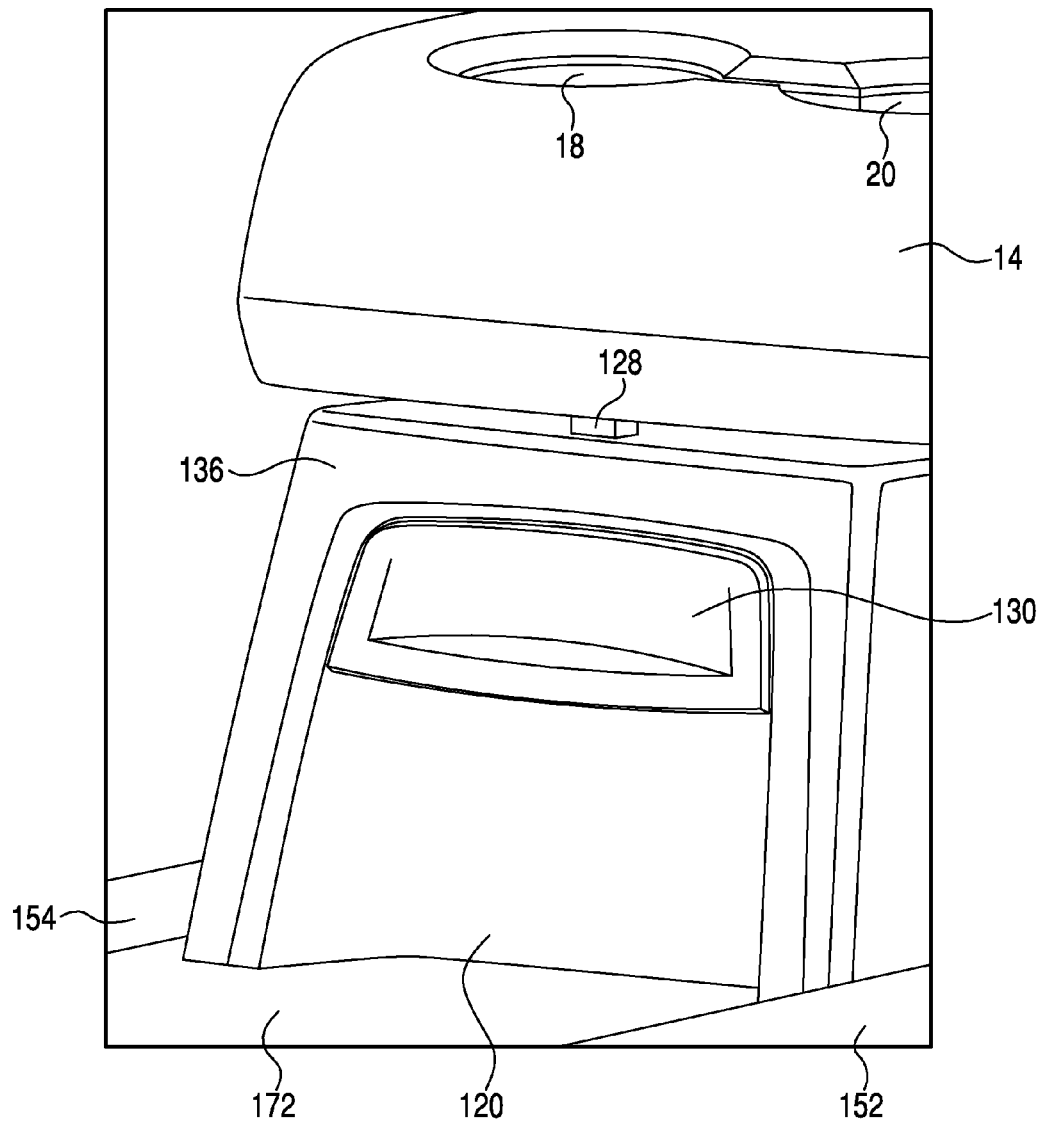
FIG. 10 is a partial front perspective view of the portions of the vehicle storage assembly (including the moveable storage assembly) of FIG. 9 with the moveable storage receptacle disposed in a closed position.

FIG. 9 is a partial cross-sectional view of portions of the vehicle storage assembly including the moveable storage assembly in accordance with the disclosed subject matter; and FIG. 10 is a partial front perspective view of the portions of the vehicle storage assembly (including the moveable storage assembly) of FIG. 9 with the moveable storage receptacle disposed in a closed position. FIG. 9 particularly shows a side trim panel 188 of vehicle storage housing 14, moveable storage receptacle first side wall 104, moveable storage receptacle side wall bottom edge 182, second base plate 170, base plate cover 172, second movement element 178, and second movement element housing 180. For clarity and brevity of the drawing, the cross-section shows the moveable storage assembly elements from a rear perspective.

Various features of the vehicle storage housing 14 of FIGS. 9 and 10 are applicable to all of the exemplary embodiments disclosed above, i.e., the first embodiment (FIGS. 1 and 2), the second embodiment (FIGS. 3 and 4), and the third embodiment (FIGS. 5 and 6). Some features shown in FIGS. 9 and 10 specifically relate to, or are consistent with, only certain of embodiments one, two and three. For example, the vehicle storage housing 14 of FIGS. 9 and 10 includes a handle 130 that is similar to the handle shown in embodiment three (FIGS. 5 and 6), and dissimilar to the button 200, 201 of embodiments one and two. (FIGS. 1-4). However, it is intended that any of the features disclosed in FIGS. 9 and 10 can be applied to any of the embodiments shown in FIGS. 1-6, and vice-versa.

Second base portion 150 can include second side frame member 154, second base plate 170, and second wedge member 158. A top portion of side trim panel 188 can be configured to interlock with second wedge member 158. Vehicle storage assembly side trim panel 188 can include a side panel extension element 190. Second wedge member 158 can include an extension element 192. Extension element 190 and extension element 192 can be arranged to interlock via a tongue-in-groove locking configuration. Once interconnected, a top edge of side trim panel 188 can overlap second wedge member 158, thereby concealing portions of second base portion 150 under side trim panel 188.

Integrated second movement element 178 and second movement element housing 180 can include rail member 194 and bearing retainment clip 198. Second movement element housing 180 can be configured to substantially surround or enclose rail member 194 and bearing retainment clip 198.

Exemplary embodiments are intended to include any variety of movement elements that can cooperate with rail member 194, such as but not limited to bearings, wheels, rollers, or other appropriate elements that can be retained within grooves 196 of rail member 194. Although one side of second movement element housing 180 and bearing retainment clip 198 is shown in FIG. 9, embodiments intend to include or otherwise cover a second movement element housing 180 and bearing retainment clip 198 on either side of rail member 194. Bearing retainment clip 198 can connect to rail member 194 in any appropriate manner, and can be configured to provide a bias against bearings or any roller elements in grooves 196.

As described previously, a bottom edge of a storage receptacle side wall can be configured to flange at a predefined angle and distance away from a receptacle wall. In the embodiment of FIG. 9, a first side wall bottom edge 182 can be configured to flange toward second wedge member 158 of second side frame member 154. First side wall bottom edge 182 can be configured to extend a predetermined distance toward second wedge member 158 that is adequate to shield rail member 194 and second movement element housing 180 from external view.

This shielding can be beneficial for various reasons. For example, this shielding may prevent or impede a user from accessing any moving mechanical elements. In addition, this shielding may provide a shield to impede or prevent dust, dirt, or loose objects from entering and interfering with shield rail member 194 and second movement element housing 180.

Base plate cover 172 can be removably secured to second base plate 170 via grommet 186 or any other appropriate mechanism. Alternative, base plate cover 172 can be permanently secured to second base plate 170.

FIG. 10 is a partial front perspective view of vehicle storage assembly housing 14 and particularly shows first and second cupholders 18, 20, moveable storage receptacle housing front cover 120 with handle 130 and latch 128, moveable storage receptacle 136, first side frame member 152, second side frame member 154, and base plate cover 172.

FIG. 10 shows moveable storage receptacle 136 in a closed and locked position and thereby hidden inside housing 14. Handle 130 can provide a convenient mechanism for a user to unlock moveable storage receptacle 136. When handle 130 is engaged by a user, tension is placed onto latch 128 via handle base mechanism 132. Once a handle tension force overcomes latch 128 bias, latch 128 retracts into latch extension housing 126.

Retraction of latch 128 can allow movable storage receptacle 136 to move freely away from housing 14 between a first closed position to a second open or partially open position. For example, handle 130 can be engaged by a user and can move the moveable storage receptacle 136 from a closed position inside housing 14 to an open or partially open position outside of housing 14. To replace moveable storage receptacle 136 into a closed position, a user may apply pressure via handle 130 or front cover 120 in a direction of housing 14.

After movement commences, latch 128 can encounter a strike plate in storage assembly housing 66. When the pressure that is applied for movement overcomes latch 128 bias, latch 128 temporarily retracts into latch extension housing 126 until movement of movable storage receptacle 136 moves latch 128 into a strike plate hole. After encountering the strike plate hole, latch 128 bias holds latch 128 into a locked position, thereby securing moveable storage receptacle 136 inside housing 14.

VII. ALTERNATIVE EMBODIMENTS

While certain embodiments of the invention are described above, and FIGS. 1-10 disclose the best mode for practicing the various inventive aspects, it should be understood that the invention can be embodied and configured in many different ways without departing from the spirit and scope of the invention.

For example, embodiments are disclosed above in the context of a vehicular storage assembly that is disposed between the driver's seat and the front passenger seat. However, the disclosed storage assemblies can be disposed at any location within a vehicle where it is beneficial to provide: 1) an exterior storage space when the movable storage receptacle is in the closed position, and 2) the ability to access the movable storage receptacle by moving the movable storage receptacle to its open position when the exterior storage space is unnecessary or not being used. Any and all of the elements of the storage assemblies can be formed in any shape and size to accommodate different locations within the vehicle, such as under any of the vehicular seats.

The vehicular storage assemblies disclosed above include a set of upper storage elements (such as hidden recessed storage areas, receptacles, cupholders, etc.), with the movable storage receptacles disposed below the upper storage elements. However, embodiments are intended to cover vehicular storage assemblies that do not include upper storage elements. For example, in some of these embodiments, an arm rest or other structure that does not provide storage is disposed above the movable storage receptacle.

In the embodiments disclosed above, the movable storage receptacles are manually moved between fully open and closed positions. However, embodiments are intended to include movable storage receptacles that automatically move between fully open and closed positions, such as via electric motors or any other known, related art, or later developed mechanism. In some of these embodiments, the movement is initiated by a user actuating a button or other actuation mechanism.

In fact, in some embodiments, the movable storage receptacles automatically move between fully open and closed positions without any direct user input. In some of these embodiments, the movable storage receptacle moves to the fully closed position when the vehicle's engine is switched off, such as to secure items stored therein. The movable storage receptacle can then move to the fully open position when the vehicle's engine is switched on.

Still other embodiments can enable a user to only move the movable storage receptacle to the fully open position upon entry of a code or via certain commands. This feature may be especially beneficial under certain circumstances. For example, the user can maintain an extra key to the vehicle that can only be accessed upon entry of the code in case the user loses the primary key.

Embodiments are also intended to include or otherwise cover methods of using and methods of manufacturing the storage assemblies disclosed above. The methods of manufacturing include or otherwise cover processors and computer programs implemented by processors used to design various elements of the storage assemblies disclosed above. Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

While the subject matter has been described in detail with reference to exemplary embodiments thereof, it will be apparent to one skilled in the art that various changes can be made, and equivalents employed, without departing from the scope of the invention. Any related art references discussed in the above Background Section are hereby incorporated by reference in their entirety.

What is claimed is:

1. A storage assembly for use with a vehicle that includes a front instrument panel, the storage assembly comprising:
    a housing defining an interior space and a front exterior surface;
    an external storage portion disposed adjacent the front exterior surface of the housing, and defining an open storage area extending between the front exterior surface of the housing and the front instrument panel; and
    a moveable storage receptacle that includes a receptacle and a storage receptacle housing that is separate from and configured to house the receptacle, the storage receptacle housing being connected to the housing for movement relative to the housing between a closed position and an open position, the receptacle defines a movable storage area, the receptacle being configured to move between the closed position in which at least a portion of the moveable storage area is disposed within the interior space of the housing, and the open position in which at least a portion of the moveable storage area is disposed proximate the open storage area.

2. The storage assembly of claim 1, wherein the movable storage receptacle includes a front exterior surface that defines a part of the front exterior surface of the housing.

3. The storage assembly of claim 1, wherein the external storage area is defined by a pair of parallel side walls that extend from the housing to the instrument panel, and a base defining a bottom surface of the external storage area.

4. The storage assembly of claim 3, wherein the movable storage receptacle includes a front panel and a pair of parallel side panels, the parallel side panels being separated by a distance that is less than a distance separating the parallel side walls of the external storage area, such that the parallel side panels are disposed between the parallel side walls of the external storage area when the moveable storage receptacle is in the open position.

5. The storage assembly of claim 1, wherein the housing includes an upper surface and a front cupholder structure, the front cupholder structure defining a pair of indentations that are open at the upper surface of the housing and that include a solid bottom the front cupholder structure being disposed directly above the moveable storage receptacle when the moveable storage receptacle is in the closed position such that the bottom surface of the indentations cover the moveable storage receptacle.

6. The storage assembly of claim 5, wherein the housing includes an upper recessed storage area defined by a pair of parallel upper walls and a movable bottom surface, the housing also defining an indentation immediately below the recessed storage area, the movable bottom surface being movable between open and closed positions, the recessed storage area and the indentation forming a contiguous open storage area when the movable bottom surface is in the open position, while the recessed storage area and the indentation forming separate storage areas when the movable bottom surface is in the closed position by virtue of being separated by the movable bottom surface.

7. The storage assembly of claim 6, wherein the housing includes a rear cupholder structure defining a pair of indentations that are open at the upper surface of the housing and that include a solid bottom surface, the upper recessed storage area being disposed between the rear cupholder structure and the front cupholder structure.

8. The storage assembly of claim 1, wherein the moveable storage receptacle includes a manually engagable handle at a front exterior surface, a locking mechanism, and a spring biasing the locking mechanism into a locked position when the moveable storage receptacle is in the closed position, manual engagement of the handle acting to overcome the bias of the spring to unlock the locking mechanism and thereby enable the moveable storage receptacle to be moved from the closed position to the open position.

9. The storage assembly of claim 1, wherein the storage receptacle housing is generally C-shaped and defined by a rear panel and parallel side panels extending from opposite sides of the rear panel, the storage receptacle housing being open at a front end to enable reception of the receptacle.

10. The storage assembly of claim 9, further including a base that supports the storage receptacle housing and the receptacle, the base including parallel base sides that are connected by lower base plates, and being configured to enable sliding movement of the receptacle by virtue of a movement element housing being connected to each of the base sides, a rail bracket being mounted to the receptacle and cooperating with bearings disposed within the movement element housing to enable sliding movement of the receptacle relative of the storage receptacle housing.

11. A vehicular storage assembly, comprising:
an external open storage area defined in part by a front instrument panel, a pair of side walls, and a bottom surface;
a housing assembly defining an interior space and a front exterior surface that defines a rear surface of the external open storage area, the housing assembly including a moveable storage receptacle that includes a receptacle and a storage receptacle housing that is separate from and configured to house the receptacle, the storage receptacle housing being connected to the housing assembly for movement relative to the housing assembly between a closed position and an open position, the receptacle defines a movable storage area, the receptacle being configured to move between the closed position in which at least a portion of the moveable storage area is disposed within the interior space of the housing assembly and the open position in which at least a portion of the moveable storage area is disposed proximate the external open storage area.

12. The vehicular storage assembly of claim 11, wherein the movable storage receptacle includes a front exterior surface that defines a part of the front exterior surface of the housing.

13. The vehicular storage assembly of claim 12, wherein the movable storage receptacle includes a front panel and a pair of parallel side panels, the parallel side panels being separated by a distance that is less than a distance separating the parallel side walls of the external storage area, such that the parallel side panels are disposed between the parallel side walls of the external storage area when the moveable storage receptacle is in the open position.

14. The vehicular storage assembly of claim 11, wherein the housing includes an upper surface and a front cupholder structure, the front cupholder structure defining a pair of indentations that are open at the upper surface of the housing and that include a solid bottom surface, the front cupholder structure being disposed directly above the moveable storage receptacle when the moveable storage receptacle is in the closed position such that the bottom surface of the indentations cover the moveable storage receptacle.

15. The vehicular storage assembly of claim 14, wherein the housing includes an upper recessed storage area defined by a pair of parallel upper walls and a movable bottom surface, the housing also defining an indentation immediately below the recessed storage area, the movable bottom surface being movable between open and closed positions, the recessed storage area and the indentation forming a contiguous open storage area when the movable bottom surface is in the open position, while the recessed storage area and the indentation forming separate storage areas when the movable bottom surface is in the closed position by virtue of being separated by the movable bottom surface.

16. The vehicular storage assembly of claim 15, wherein the housing includes a rear cupholder structure defining a pair of indentations that are open at the upper surface of the housing and that include a solid bottom surface, the upper recessed storage area being disposed between the rear cupholder structure and the front cupholder structure.

17. The vehicular storage assembly of claim 11, wherein the moveable storage receptacle includes a manually engagable handle at a front exterior surface, a locking mechanism, and a spring biasing the locking mechanism into a locked position when the moveable storage receptacle is in the closed position, manual engagement of the handle acting to overcome the bias of the spring to unlock the locking mechanism and thereby enable the moveable storage receptacle to be moved from the closed position to the open position.

18. The vehicular storage assembly of claim 11, wherein the storage receptacle housing being generally C-shaped and defined by a rear panel and parallel side panels extending from opposite sides of the rear panel, the storage receptacle housing being open at a front end to enable reception of the receptacle.

19. The vehicular storage assembly of claim 18, further including a base that supports the storage receptacle housing and the receptacle, the base including parallel base sides that are connected by base plates, and being configured to enable sliding movement of the receptacle by virtue of a movement element housing being connected to each of the base sides, a rail bracket being mounted to the receptacle and cooperating with bearings disposed within the movement element housing to enable sliding movement of the receptacle relative of the storage receptacle housing.

20. A method of manufacturing a storage assembly for use with a vehicle, the method comprising:
defining an interior space with a housing;
disposing an external storage portion adjacent a front exterior surface of the housing so as to define an open storage area between the front exterior surface of the housing and a front instrument panel of a vehicle;
configuring a storage receptacle housing to move relative to the housing between an open position and a closed position;
configuring the storage receptacle housing to house a receptacle as the storage receptacle housing moves between the open position and the closed position;
defining a movable storage area with the receptacle; and
configuring the receptacle to move between the closed position in which at least a portion of the moveable storage area is disposed within the interior space of the housing, and the open position in which at least a portion of the moveable storage area is disposed proximate the open storage area.

* * * * *